March 19, 1968     J. B. CHAPLIN     3,373,836
AIR CUSHION VEHICLE STABILIZING MEANS
Filed Nov. 15, 1965     4 Sheets-Sheet 1
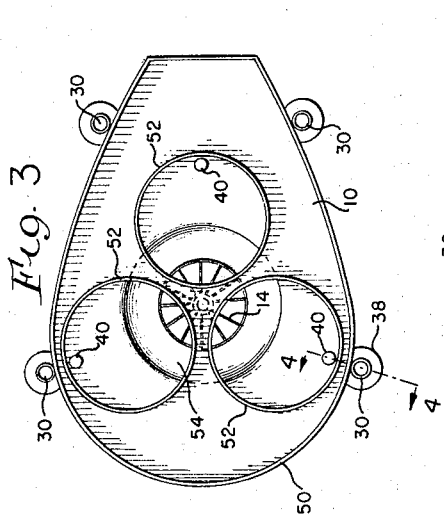
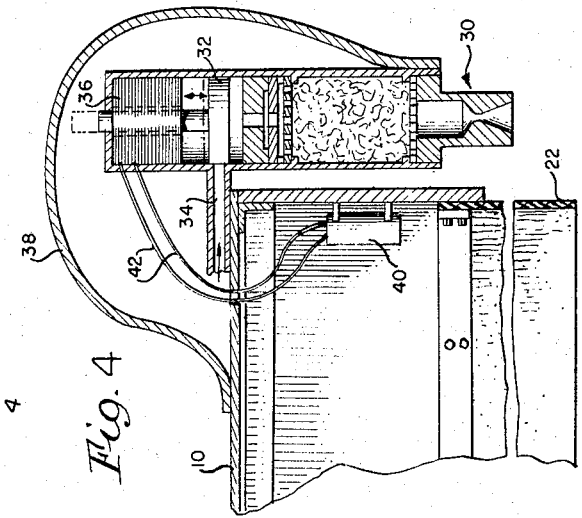
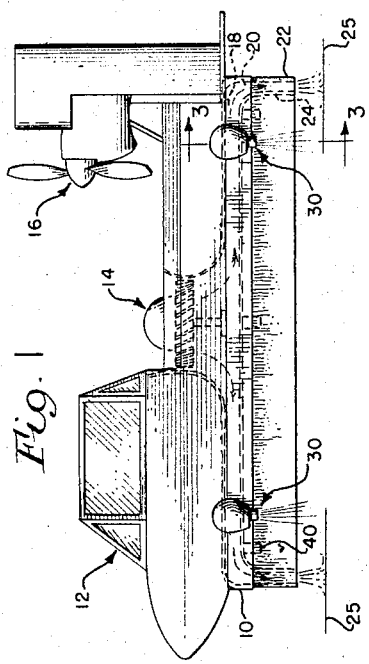
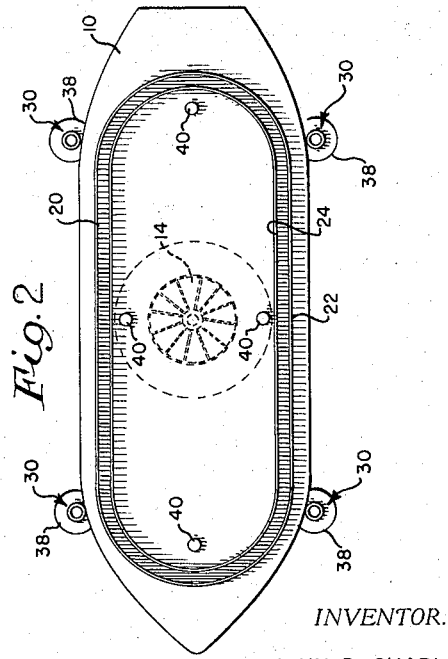
INVENTOR.
JOHN B. CHAPLIN
BY
Bean, Brooks, Buckley & Bean
ATTORNEYS March 19, 1968   J. B. CHAPLIN   3,373,836
AIR CUSHION VEHICLE STABILIZING MEANS
Filed Nov. 15, 1965   4 Sheets-Sheet 2
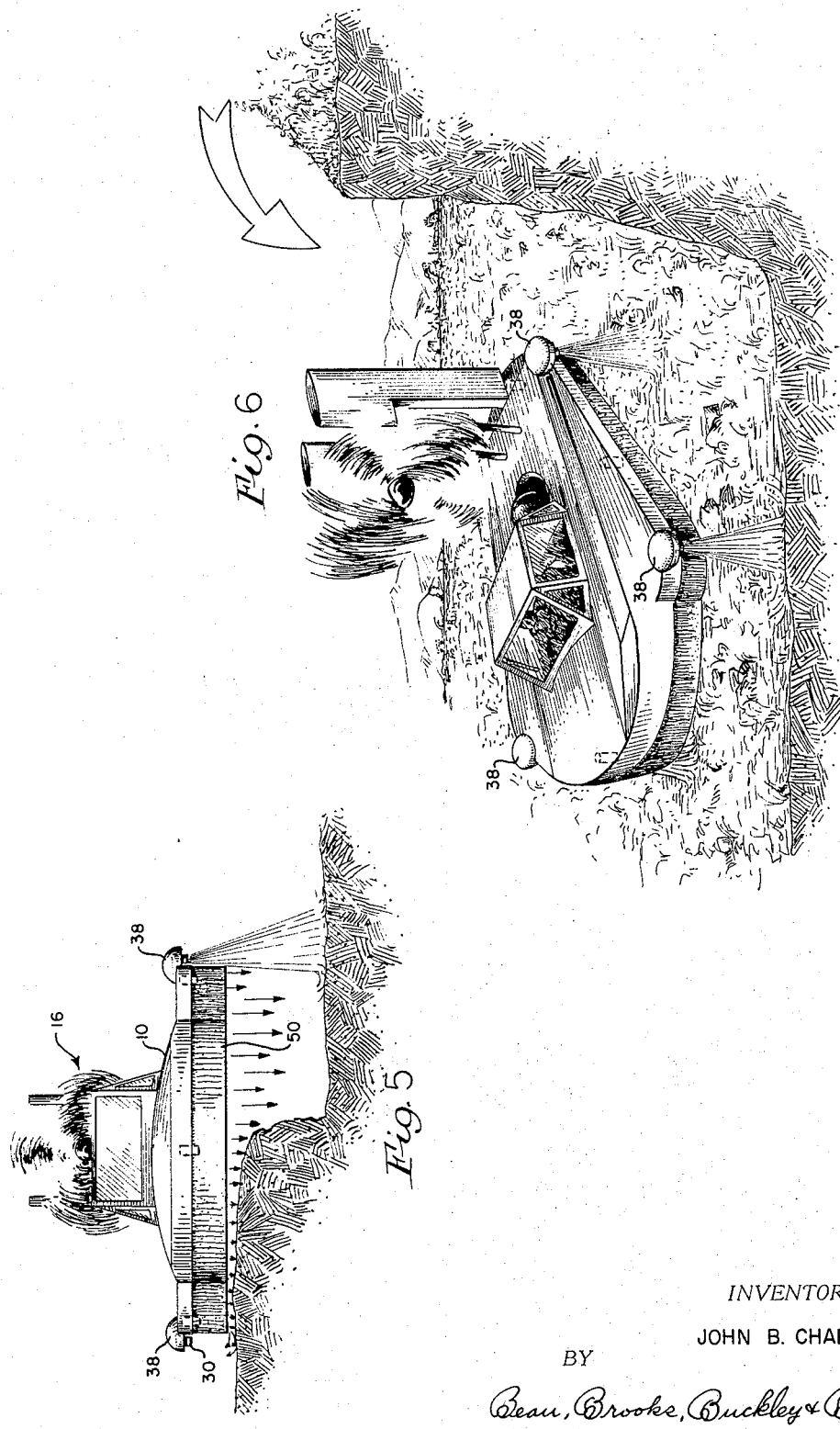
INVENTOR.
JOHN B. CHAPLIN
BY
Bean, Brooks, Buckley & Bean
ATTORNEYS

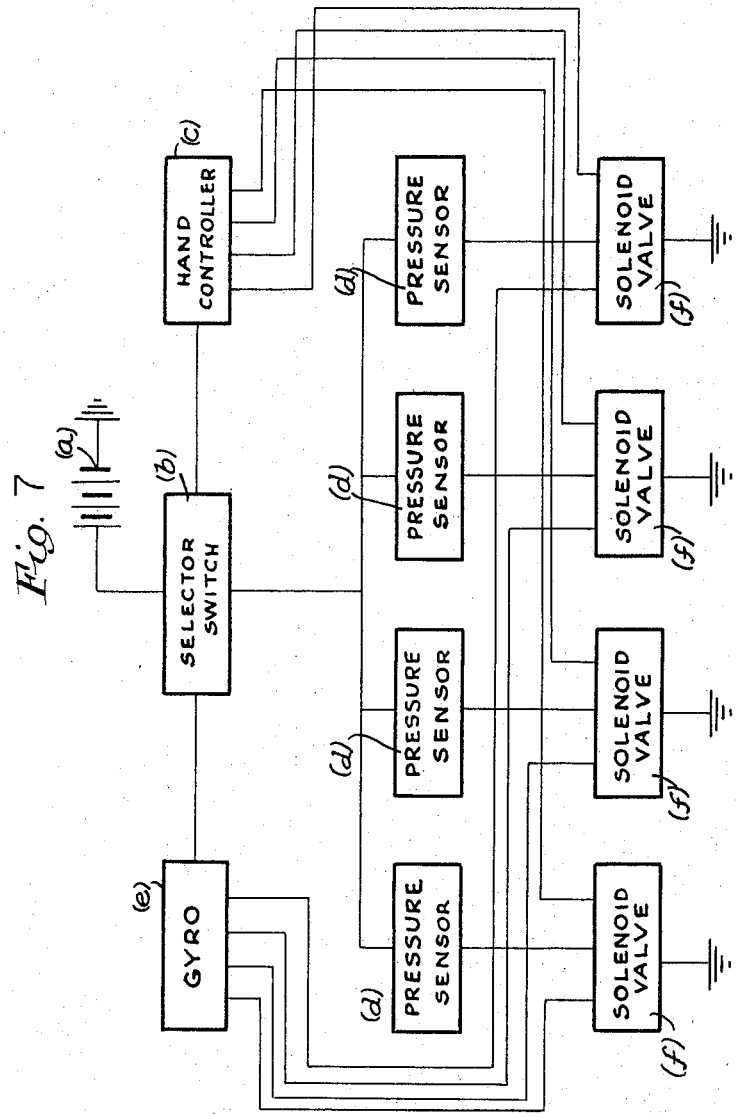

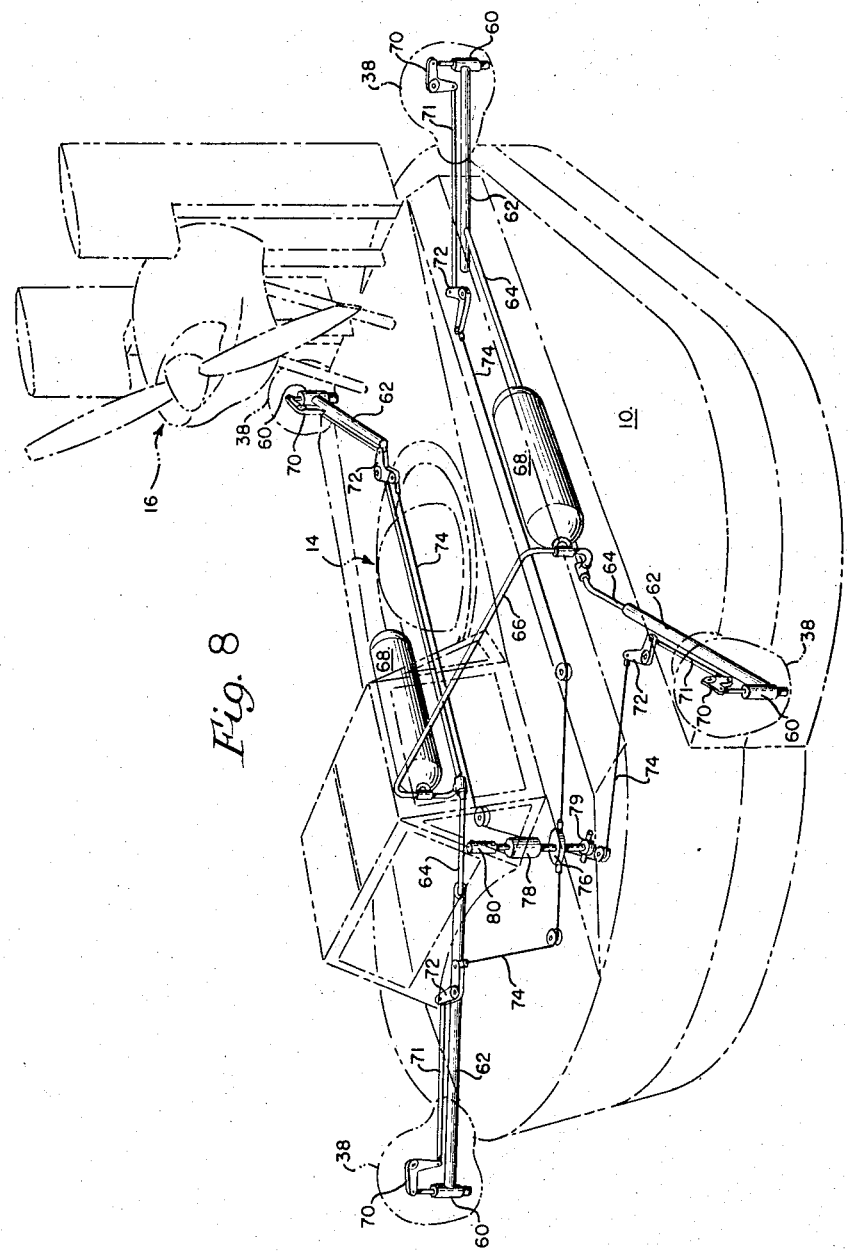

United States Patent Office 3,373,836
Patented Mar. 19, 1968

3,373,836
AIR CUSHION VEHICLE STABILIZING MEANS
John Bradley Chaplin, Williamsville, N.Y., assignor to Bell Aerospace Corporation, Wheatfield, N.Y.
Filed Nov. 15, 1965, Ser. No. 507,755
7 Claims. (Cl. 180—118)

ABSTRACT OF THE DISCLOSURE

A ground effect machine supported on a cushion of air and provided with steering and propulsion means and additionally with rigidly secured downwardly directed thrust generating engines and control means normally deactivating the engines but effective to actuate same selectively to control movements of the machine about its pitch and roll axes to maintain the machine in a generally level attitude about such axes irrespective of attitude-changing forces due to any abrupt irregularities present in the reaction surface over which the machine is traveling.

---

This invention relates to machines of the "air cushion vehicle" or "ground effect machine" type, and more particularly to means providing attitude stability characteristics for such vehicles.

It is often critical to ensure that vehicles of this type may be operated over irregular terrain while consistently maintaining a precisely horizontal or "level" attitude. For example, in event the vehicle is to be employed as a "gun-platform" or the like, it will be apparent that it is of prime importance that the vehicle be operatively maintained on an even keel throughout a combat maneuver. Also, by way of further example, it has been determined that such vehicles may with safety fall from heights of as much as up to one hundred feet (such as when accidentally driven for example over a cliff, crevasse, or other drop in the terrain); without too serious damage to the vehicle and/or occupants, due to the shock-absorbing capabilities of the air cushion under the vehicle, provided however that the machine remains in its normal operating attitude. This is not the case if the vehicle tilts out of substantially horizontal attitude incidental to the fall.

It is the primary object of the present invention to provide an improved vehicle as aforesaid which is automatically (or, under pilot control) stabilized, in improved manner, against substantial tilting about its pitch and/or roll axes when moving over irregular terrain and/or in the event that it moves out over a cliff, crevasse, gully, ditch, or the like.

Another object is to provide in a machine as aforesaid improved means for stabilizing the machine in attitude when operating over irregular terrain such as would tend to cause the conventional machine to tilt and "dump" its air cushion, and to thereupon upset or otherwise meet disaster.

Other objects of the invention will appear from the following specification and the accompanying drawing, wherein:

FIG. 1 is a side elevational view of a peripheral jet type machine embodying an attitude stabilization means of the invention;

FIG. 2 is a bottom plan view of the machine of FIG. 1;

FIG. 3 is a bottom plan view of a tri-cell type ground effect machine embodying the invention;

FIG. 4 is an enlarged scale sectional view taken along line 4—4 of FIG. 3;

FIG. 5 is a frontal view of a machine of the invention illustrating its mode of operation when "straddling" a ditch edge or the like;

FIG. 6 is an illustration of how the machine may drop with safety over a cliff or the like;

FIG. 7 is a schematic of an automatic attitude control system of the invention; and FIG. 8 is a perspective diagrammatic illustration of a pilot-controllable system of the invention.

The invention is applicable to many types of ground effect machines, but by way of example it is shown herein at FIGS. 1, 2, as being embodied in a single cell peripheral jet type machine; and at FIGS. 3–8 as being embodied in a "tri-cell" type machine. It is to be understood, however, that the invention is equally applicable to the plenum chamber type machines, or any other presently practicable forms of ground effect machines. Referring now to FIGS. 1, 2, the machine shown therein comprises generally a hull or platform structure 10 supporting a passenger compartment 12; a "lift fan" 14, and a propulsion-steering empennage 16. The duct delivering air under pressure from the fan 14 is arranged to discharge into a radially extending manifold system 18 which terminates in a downwardly directed annular jet discharge duct 20. Concentrically arranged flexible skirts as indicated at 22, 24 are provided to hang downwardly below the rigid structure of the craft around the periphery thereof so as to assist in the maintenance of a cushion of pressurized air within the confines of the skirt structure and between the vehicle hull and the surface over which it is operating as indicated at 25, FIG. 1.

In accordance with the present invention a plurality of reaction thrust nozzles as indicated generally at 30 are mounted on the vehicle frame, and are so disposed in plan view thereon as to be adapted, upon selective operation thereof, to generate thrust moments for rotating the craft about its pitch and roll axes. Thus, for example, as shown in FIGS. 1, 2, 3, a pair of thrust nozzles may be mounted thereon so as to be directed downwardly at opposite sides of the vehicle at positions thereon equally spaced from the roll axis of the vehicle. Another pair of thrust engines are provided to straddle the pitch axis of the vehicle; and thus one will be located at the bow of the vehicle and the other at the stern. Hence, alternate operation of the thrust engines at the fore or aft ends of the vehicle will result in attitude control of the vehicle about its pitch axis, and alternate operation of the engines at opposite sides thereof will result in attitude control of the vehicle about its roll axis.

The thrust engines 30 may be of any suitable type, but as illustrated by way of example herein at FIG. 3, they may be of the type disclosed for example in U.S. Patent 3,008,672, dated Nov. 14, 1961. That is to say, they may be of the type employing a monopropellant fuel adapted when passing through a catalyst to evolve tremendous volumes of gas. For example, hydrogen peroxide may be employed for this purpose as described in the aforesaid patent; and it will be appreciated that this type engine is particularly adapted for start-stop operations under control of any suitable type fuel supply control valve. However, as shown by way of example herein at FIG. 4, the valve may be of the type comprising a piston 32 movable relative to a fuel inlet port 34 as by means of a solenoid 36.

It is a particular feature of the present invention that by virtue of the use of thrust engines of the type referred to for attitude control purposes, the jet discharges are at extremely high pressures and therefore effective although they may not be reacting against any fixed reaction surface. Thus, these attitude control mechanisms provide corrective attitude control forces replacing the vehicle support forces normally furnished by the relatively low pressure air cushion under the vehicle which is operable as long as the fixed reaction surface (terrain or water) is in close proximity thereunder. In event an air cushion supported vehicle of the prior type moves out over irregular terrain, or by way of further example, over the edge of a ditch, crevasse, or the like, the immediate loss of air cushion reaction forces under the overhanging bottom surface area of the vehicle, results in an immediate tilting and falling off of the vehicle into the ditch or crevasse. In the case of the persent invention, however, whenever any such loss of vehicle support is experienced such as to tend to permit the vehicle to assume an undesirable or hazardous attitude, the fall-off is immediately countered by operation of an appropriate one or more of the thrust engines.

Start-stop operations of the thrust engines for attitude control purposes as explained hereinabove may be arranged to be automatic in response to the sensing of any attitude changing conditions. For example, as shown in FIGS. 1-3, atmospheric-pressure sensing devices as indicated generally at 40 may be provided in pairs; each one of a pair being disposed respectively at opposite sides of the pitch and roll axes of the machine but within the pressurized cushion area under the machine. Preferably, the sensors will be mounted at the remote fore and aft and opposite side portions of the vehicle.

Hence, each sensor 40 will detect sudden local drops of air cushion pressures in the proximity thereof, and may be operatively coupled as indicated at 42 (FIG. 4) with the solenoid 36 controlling the positionally corresponding thrust engine 30. Thus, for example in event the sensor 40 under the bow of the machine detects a local pressure drop in the air cushion at that position, the sensor will operate to cause the forwardly located thrust engine to go into operation so as to keep the vehicle on even keel. Similarly, in event one of the sidewise disposed sensors detects a local loss of pressure within the air cushion area, it will cause the thrust engine at that side of the vehicle to go into operation so as to counter the tendency of the vehicle to roll in response to the air cushion loss.

FIGS. 3, 4, 5, 6 and 8 illustrate application of the invention to a tri-cell type ground effect machine wherein the rigid hull structure 10 is provided with a peripherally hanging outer skirt 50 while a plurality of inner skirts 52 are clustered under the hull in common open communication with an air duct 54 conveying the discharge from the fan 14 into the cells 52, as shown for example in U.S. Patent No. 3,174,573. It is not contemplated that the thrust engines be furnished with such power capabilities as to enable them to provide total vertical support for lifting the vehicle upwardly; but simply to be of sufficient capabilities as to correct for any undesirable attitude changes of the vehicle as it operates over irregular terrain. Hence, the system will operate to stabilize the vehicle when temporarily operating over rough terrain, ditches, crevasses, or the like; and even when falling into a gully or the like the machine will be maintained in substantially horizontal attitude so that when it arrives at the bottom of the depression the air cushion under the vehicle will be permitted to function effectively as a landing shock-absorbing agent.

FIG. 7 illustrates schematically and by way of example a suitable automatic control system for the thrust engines of the machine of the invention. As shown therein, a power supply of suitable voltage is provided as indicated at *a* to the selector switch *b*. The selector switch *b* is controllable at the discretion of the machine operator so as to provide either for manual operation of the control system by the hand controller *c* or automatically in response to pressure change sensings at various positions in the air cushion cells by the pressure sensors *d*, as explained hereinabove. Whereas only four pressure sensors are illustrated in the schematic FIG. 7, it will be appreciated that any other desired number of sensors may be employed, also as explained hereinabove. Still further, the machine operator may set the selector switch *b* so as to permit a gyro as indicated at *e* to take over control of the system. The gyro, being sensitive to any attitude deviation from the horizontal, will automatically operate the appropriate solenoid valve or valves as indicated at *f*. In any case the solenoid valves being brought into play by whichever mode of control operation is selected, will actuate the proper thrust engine or engines, for maintaining the craft on "even keel" (or horizontal attitude) as explained hereinabove.

FIG. 8 illustrates application of the invention to a ground effect machine wherein the controls of the thrust engines are arranged to be directly pilot-actuated. Also, as illustrated in this case, the thrust engines as indicated generally at 60 are mounted to extend outwardly at substantial lever arm lengths from the vehicle hull as illustrated in FIGS. 5, 6, for example, as by means of hollow struts 62 carrying hydrogen peroxide fuel or the like to the catalyst chambers. Conduits 64-66 conveying fuel to the engines lead from fuel supply tanks 68, 68. The engine control valves are arranged to be manually actuated through means of bell crank and cable systems as indicated at 70, 71, 72, 74; the cables 74 dead-ending into a bracket 76 carried by a universally movable control stick 78. The control handle is indicated at 80, and the stick 78 is swivelably mounted on the machine frame as indicated at 79. Further by way of example, the control stick mechanism 78 may be of the type disclosed in U.S. Patent No. 3,149,806.

Thus it will be appreciated that the invention provides an improved system for ensuring precisely stable attitude operations of vehicles of this type over irregular terrain; and that whereas only a few forms of the invention have been illustrated by way of example and described in detail hereinabove, various changes may be made therein without departing from the spirit of the invention or the scope of the following claims.

I claim:

1. In a ground effect machine of the type having a body, means on said body for forming and confining a low pressure air cushion beneath said body to support the machine in elevated relation above a reaction surface, and means for propelling and steering said body over said reaction surface in a generally level attitude, said body having roll and pitch axes, the improvement comprising:
    a plurality of rigidly secured downwardly directed thrust generating engines on said body spaced outwardly of said air cushion confining means and at a distance from the center of gravity of said body effective to counteract roll and pitch of said body about the said axes,
    and control means responsive to variations in attitude-producing forces on said body about said roll and pitch axes for selectively actuating said engines to maintain said body in its generally level attitude about said axes irrespective of attitude-changing forces due to any abrupt irregularities present in the reaction surface over which said machine is traveling.

2. A ground effect machine as set forth in claim 1 wherein said control means comprises pressure sensing devices responsive to atmosphere-pressure changes at opposite sides of the attitude change axis of the machine.

3. A ground effect machine as set forth in claim 1 wherein said control means comprises pressure sensing devices disposed interiorly of said low pressure air cushion space.

4. A ground effect machine as set forth in claim 1 wherein said control means comprises gyroscopically-controlled mechanism sensing deviations of said machine body portion away from level attitude relative to the horizon.

5. A ground effect machine as set forth in claim 1 wherein said control means is pilot-actuated in response to deviations of the machine body from "level" attitude.

6. A ground effect machine as set forth in claim 1 wherein said control means is automatically responsive to any deviations of the machine body portion away from level attitude.

7. A ground effect machine of the type having a body, means on said body for forming and confining a low pressure air cushion beneath said body to support the machine in elevated relation above a reaction surface, and means for propelling and steering said body over said reaction surface in a generally level attitude, said body having pitch and roll axes, the improvement comprising:

a plurality of rigidly secured downwardly directed thrust generating engines on said body spaced outwardly of said cushion confiining means and at a distance from the center of gravity of said body effective to counteract roll and pitch of said body about the said axes, and control means normally deactivating said thrust generating engines whereby said machine is supported solely by said low pressure air cushion, said control means including mechanism for selectively actuating said engines to maintain said body in its generally level attitude irrespective of attitude-changing forces due to any abrupt irregularities present in the reaction surface over which said machine is traveling.

References Cited

UNITED STATES PATENTS

| | | |
|---|---|---|
| 2,943,822 | 7/1960 | Hamilton. |
| 3,152,656 | 10/1964 | Collis _____ 180—7 |
| 3,265,142 | 8/1966 | Winter _____ 180—7 |

A. HARRY LEVY, *Primary Examiner.*